May 7, 1963   L. A. BARRY ET AL   3,088,751
VEHICLE TIRE SPRAY SHIELD
Filed Jan. 30, 1962
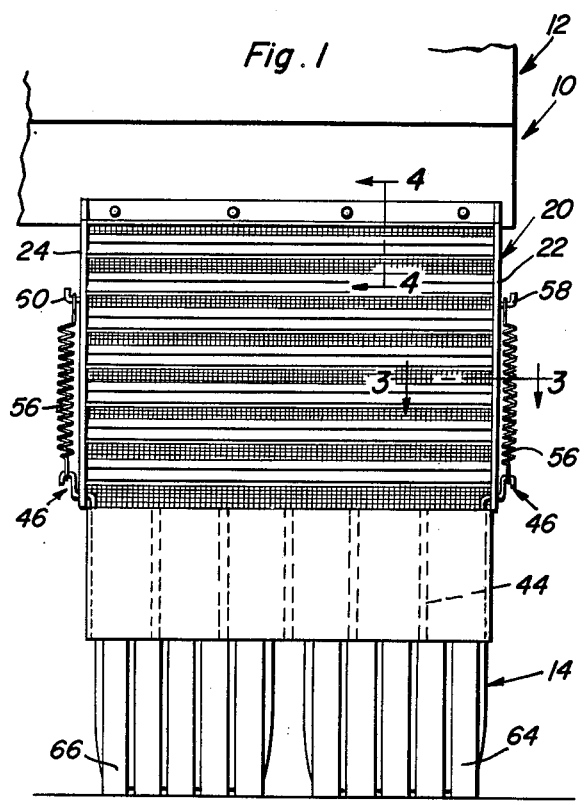
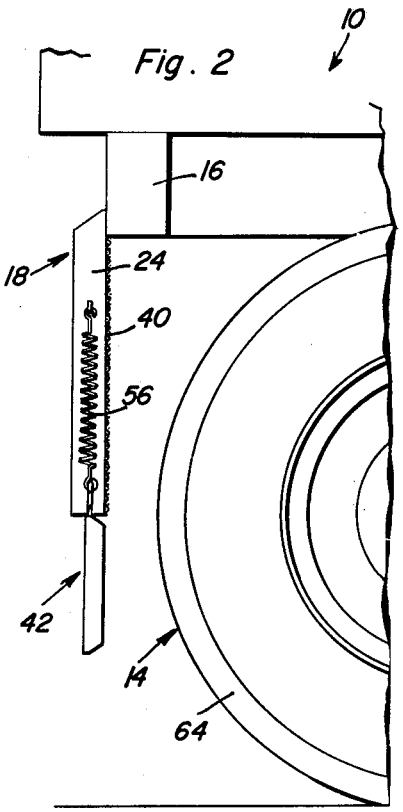
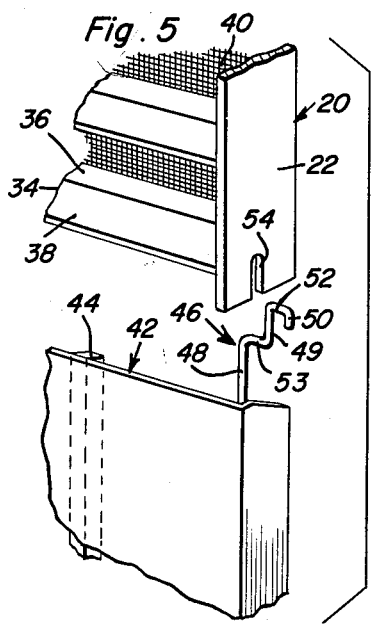
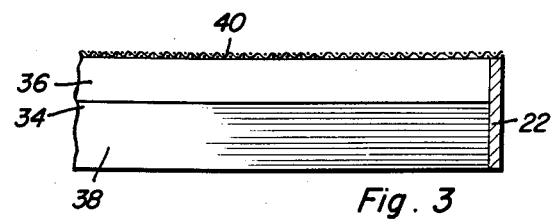
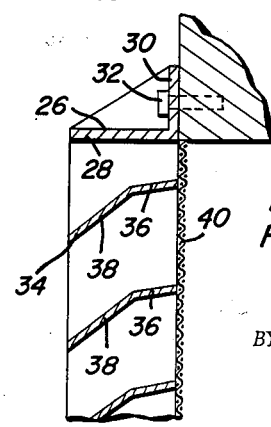
Louis A. Barry
Robert P. Considine
INVENTORS

United States Patent Office 3,088,751
Patented May 7, 1963

3,088,751
VEHICLE TIRE SPRAY SHIELD
Louis A. Barry, 503½ 4th Ave., Sterling, Ill., and Robert P. Considine, 20 9th Ave., Fulton, Ill.
Filed Jan. 30, 1962, Ser. No. 169,835
10 Claims. (Cl. 280—154.5)

This invention relates to a novel and useful vehicle tire spray shield and more specifically to a spray shield which is primarily designed to be mounted behind the rear wheels of a heavy vehicle provided with dual wheels for the purpose of reducing the spray thrown rearwardly and upwardly from the rear wheels of the vehicle while traveling over wet roads.

It is to be understood that the vehicle tire spray shield may also be conveniently used on other vehicles which are not provided with dual wheels and on relatively light vehicles if it is desired to reduce the spray thrown up by the rear wheels of such other vehicles.

The vehicle tire spray shield is constructed in a manner whereby heavy large foreign particles thrown up by the rear wheels of a vehicle may be prevented from flying rearwardly and upwardly. However, while most flaps are fully capable of preventing stones and the like which are wedged between the dual wheels of a vehicle from being thrown rearwardly and upwardly of the vehicle while the vehicle is traveling at high speeds, most wheel flaps are imperforate and somewhat flexible. If the vehicle to which such flexible and imperforate wheel flaps are secured is traveling at high speeds, the rear end edges of the flaps have a tendency to be blown rearwardly and upwardly thus reducing the effectiveness of the wheel flap. Further, inasmuch as conventional wheel flaps are imperforate the turbulence effected by these flaps while traveling at high speeds has a tendency to increase the amount of water spray which is thrown rearwardly and upwardly by a vehicle to which they are secured.

If a heavy vehicle is traveling at high speeds and is provided with conventional imperforate flexible wheel flaps, should that vehicle overtake and pass another vehicle which is moving in the same direction, the water spray thrown rearwardly and upwardly by the passing vehicle as it pulls back into a righthand lane in front of the vehicle which has been passed makes it very difficult for the driver of the passed vehicle to see through his windshield even though his windshield wipers may be operating at high speed.

It is accordingly the main object of this invention to provide a vehicle tire spray shield or wheel flap which will adequately perform the function of preventing large objects from being thrown rearwardly and upwardly from the rear wheels of a vehicle traveling at high speeds while simultaneously being capable of appreciably reducing the amount of water spray which is thrown upwardly by that vehicle when traveling over wet road surfaces.

A further object of this invention, in accordance with the immediately preceding object is to provide a vehicle tire spray shield including a swingable lower end portion which is normally urged by gravity and spring pressure toward a depending position in direct alignment with the normal path of objects which are thrown rearwardly and upwardly by the rear wheels of a vehicle traveling at moderate speeds.

A still further object of this invention, in accordance with the immediately preceding object, is to provide a swingable imperforate lower flap for the vehicle tire spray shield which is attached to the upper portion of said vehicle tire spray shield and constructed in a manner so that if in passing over any obstruction or rough ground said lower flap may easily swing up and pass over these obstructions with no damage incurred.

A still further object of this invention is to provide a swingable imperforate lower flap attached to the upper portion of said vehicle tire spray shield and constructed in a manner so that if the lower flap is caught between a curb or other obstruction when said vehicle is backing up, as when approaching a loading dock, it will be possible for said lower flap to move in a substantially vertical direction thus preventing damage to itself and/or the upper portion of said vehicle tire spray shield.

A final object of this invention to be specifically enumerated herein is to provide a vehicle tire spray shield in accordance with the preceding objects which will conform to conventional forms of manufacture, be of simple construction and automatic in operation so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a fragmentary rear elevational view of a wheeled vehicle provided with dual rear wheels and having a vehicle tire spray shield construction in accordance with the present invention mounted rearwardly of one dual wheel assembly;

FIGURE 2 is a fragmentary side elevational view of the embodiment illustrated in FIGURE 1;

FIGURE 3 is an enlarged fragmentary horizontal sectional view taken substantially upon the plane indicated by the section line 3—3 of FIGURE 1;

FIGURE 4 is an enlarged fragmentary vertical sectional view taken substantially upon the plane indicated by the section line 4—4 of FIGURE 1; and FIGURE 5 is a fragmentary exploded perspective view illustrating the manner in which the lower flap of the vehicle tire spray shield is pivotally secured to the upright frame portion of the spray shield.

Referring now more specifically to the drawings the numeral 10 generally designates a wheeled vehicle including a body generally referred to by the reference numeral 12 and a dual wheel assembly generally referred to by the reference numeral 14.

The body 12 includes a depending transverse support member 16 and it will be noted that the vehicle tire spray shield of the instant invention which is generally designated by the reference numeral 18 is secured to the transverse support member 16 and depends downwardly therefrom in general horizontal alignment with the upper portion of the dual wheel assembly 14.

The tire spray shield 18 includes an upright, generally rectangular and rigid frame generally referred to by the refernce numeral 20. The rigid frame 20 includes a pair of upright opposite side members 22 and 24 which are interconnected at their upper ends by means of a transversely extending upper frame member 26. From FIGURE 4 of the drawing it will be noted that the upper frame member 26 is generally L-shaped in cross-section and includes a pair of angularly disposed legs 28 and 30. A plurality of fasteners 32 are secured through the leg 30 at points spaced longitudinally therealong and are engaged with the transverse support member 16 in order to mount rigid frame 20 on the transverse support member 16.

A plurality of transversely extending and generally horizontally disposed louvers 34 are secured between the side members 22 and 24 at points spaced longitudinally along the side members 22 and 24.

From FIGURE 4 of the drawings it may be seen that each of the louvers are panel-like and include longitudinally extending opposite side marginal portions 36 and 38 which are disposed in angular relation to each other. The rear marginal portions 38 are rearwardly and downwardly inclined as are the forward marginal portions 36 and it will be noted that the rear marginal portions 38 are more downwardly inclined than the forward marginal portions 36. It will be further noted that the marginal portion 38 of one louver does not overlap the forward marginal portion 36 of the adjacent lower louver. The vertical distance between the rear marginal portion 38 of one louver and the forward marginal portion 36 of the adjacent lower louver may vary from zero to approximately 1¼ inches while still maintaining effective shielding action.

A coarse screen panel 40 is secured between the forward edges of the opposite side members 22 and 24 and the forward longitudinal edges of the louvers 34 are disposed in abutting engagement with the rear face of the panel 40.

With attention now directed to FIGURES 1, 2 and 5 of the drawings it will be seen that a rigid lower flap generally referred to by the reference numeral 42 is provided. The rigid flap 42 includes a plurality of generally parallel upright bracing members 44 and also a pair of upwardly projecting and downwardly opening hook assemblies 46. Each of the hook assemblies 46 includes an arm 48 by which the hook assembly 46 is secured to the flap 42, a first laterally offset leg 49 and a second leg 50 which generally parallels and is connected to the corresponding first leg 49 by means of a bight portion 52. The laterally directed portion 53 which interconnects the adjacent ends of arm 48 and leg 49 defines a stub axle portion. The lower end of each of the side members 22 and 24 has a downwardly opening notch or slot 54 formed therein and each of the stub axle portions 52 is seated in the corresponding slot 54. A pair of expansion springs 56 is provided and is secured between the hooks 58 and 60 carried by the upper ends of the side members 22 and 24, respectively, and the outer ends of the corresponding stub axle portions 52 and are utilized to yieldably urge the stub axle portions 52 into seated engagement in the slots 54 whereby the stub axle portions 52 will be rotatably supported for free swinging movement of the lower end of the flap 42.

In operation, as the vehicle 10 is traveling over wet surfaces, the spray effected by the dual wheel assembly, which is materially reduced due to the decrease in turbulence effected by the new wheel flap, is directed rearwardly and downwardly by means of the louvers 34 and lower flap portion 42 and any solid objects turned rearwardly and upwardly by tire assembly 14 will be checked in flight either by means of the coarse screen 40 attached to the upper shield portion 20 or by the spring positioned lower flap 42.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A vehicle tire spray shield comprising an upright rigid frame, means carried by the upper end of said frame adapted to support said frame from a vehicle body in depending relation therefrom, behind and in generally horizontal alignment with at least one support wheel of said vehicle and said frame disposed in a plane extending transversely of said vehicle, said frame including upright opposite side members interconnected at their upper ends by means of a transversely extending upper frame member, a plurality of elongated transversely extending and generally horizontally disposed louvers secured between said side members at points spaced longitudinally therealong, said louvers having at least their rear longitudinal marginal portions rearwardly and downwardly inclined, a coarse screen panel secured between the forward edges of said opposite side members, said louvers having their forward longitudinal side edges disposed in abutting engagement with the rear face of said panel.

2. A vehicle tire spray shield comprising an upright rigid frame, means carried by the upper end of said frame adapted to support said frame from a vehicle body in depending relation therefrom, behind and in generally horizontal alignment with at least one support wheel of said vehicle and said frame disposed in a plane extending transversely of said vehicle, said frame including upright opposite side members interconnected at their upper ends by means of a transversely extending upper frame member, a plurality of elongated transversely extending and generally horizontally disposed louvers secured between said side members at points spaced longitudinally therealong, said louvers having at least their rear longitudinal marginal portions rearwardly and downwardly inclined, said louvers each being panel-like and include longitudinally extending opposite side portions disposed in angular relation to each other.

3. The combination of claim 2 wherein the opposite side portions of each of said louvers adjoin each other.

4. The combination of claim 3 wherein the forward side marginal portions of said louvers are also rearwardly and downwardly inclined.

5. The combination of claim 4 wherein said forward side edge portion of each of said louvers is less rearwardly and downwardly inclined than the corresponding rear side edge portion.

6. A vehicle tire spray shield comprising an upright rigid frame, means carried by the upper end of said frame adapted to support said frame from a vehicle body in depending relation therefrom, behind and in generally horizontal alignment with at least one support wheel of said vehicle and said frame disposed in a plane extending transversely of said vehicle, said frame including upright opposite side members interconnected at their upper ends by means of a transversely extending upper frame member, a plurality of elongated transversely extending and generally horizontally disposed louvers secured between said side members at points spaced longitudinally therealong, said louvers having at least their rear longitudinal marginal portions rearwardly and downwardly inclined, an upright panel-like lower flap adapted to extend transversely of said vehicle, means pivotally securing the upper edge portion of said flap to the lower end of said frame for movement about an axis extending across the upper edge portion of said flap and the lower marginal portion of said frame, said lower flap includes axially aligned stub-axle portions disposed in general vertical alignment with the lower ends of said side members of said frame, said pivotal securing means including means carried by said side members rotatably journaling said stub axle portions.

7. The combination of claim 6 wherein said journaling means comprises downwardly opening notches formed in the lower ends of said side members rotatably receiving said stub axle portions, and expansion spring means connected between said frame and said panel yieldably urging said panel toward a position with said stub axle position seated in said notches.

8. A vehicle tire spray shield comprising an upright rigid frame, means carried by the upper end of said frame adapted to support said frame from a vehicle body in depending relation therefrom, behind and in generally horizontal alignment with at least one support wheel of said vehicle and said frame disposed in a plane extending transversely of said vehicle, said frame including upright opposite side members interconnected at their upper ends by means of a transversely extending upper frame member, a plurality of elongated transversely extending and generally horizontally disposed louvers secured between said side members at points spaced longitudinally therealong, said louvers having at least their rear longitudinal marginal portions rearwardly and downwardly inclined, an upright panel-like lower flap adapted to extend transversely of said vehicle, means pivotally securing the upper edge portion of said flap to the lower end of said frame for movement about an axis extending across the upper edge portion of said flap and the lower marginal portion of said frame, said louvers are each panel-like and include longitudinally extending opposite side edge portions disposed in angular relation to each other, the rear lowermost side edge of each of said louvers being spaced slightly above the uppermost portion of the louver disposed immediately therebelow.

9. A vehicle tire spray shield comprising an upright rigid frame, means carried by the frame adapted to support said frame from a vehicle body in depending relation therefrom, behind and in generally horizontal alignment with at least one support wheel of said vehicle and said frame being disposed in a plane extending transversely of said vehicle, said frame including upright opposite side members adjacent its lower edge portion, an upright panel-like lower flap adapted to extend transversely of said vehicle, means pivotally securing the upper edge portion of said flap to the lower end of said frame for movement about an axis extending across the upper edge of said flap and the lower marginal portion of said frame, said lower flap including an axially aligned stub axle portion disposed in general vertical alignment with the lower ends of said side members of said frame, said pivotal securing means including means carried by said side members rotatably journaling said stub axle portions.

10. The combination of claim 9 wherein said journaling means comprises downwardly opening notches formed in the lower ends of said side members rotatably receiving said stub axle portions, and expansion springs connected between said frame and said panel yieldably urging said panel toward a position with said stub axle portion seated in said notches.

References Cited in the file of this patent

UNITED STATES PATENTS

| | | |
|---|---|---|
| 1,306,364 | Warman | June 10, 1919 |
| 2,546,781 | Rheeling | Mar. 27, 1951 |
| 2,699,955 | Eaves | Jan. 18, 1955 |
| 2,714,015 | Sherman | July 26, 1955 |
| 2,782,053 | Long | Feb. 19, 1957 |